Patented Aug. 15, 1933

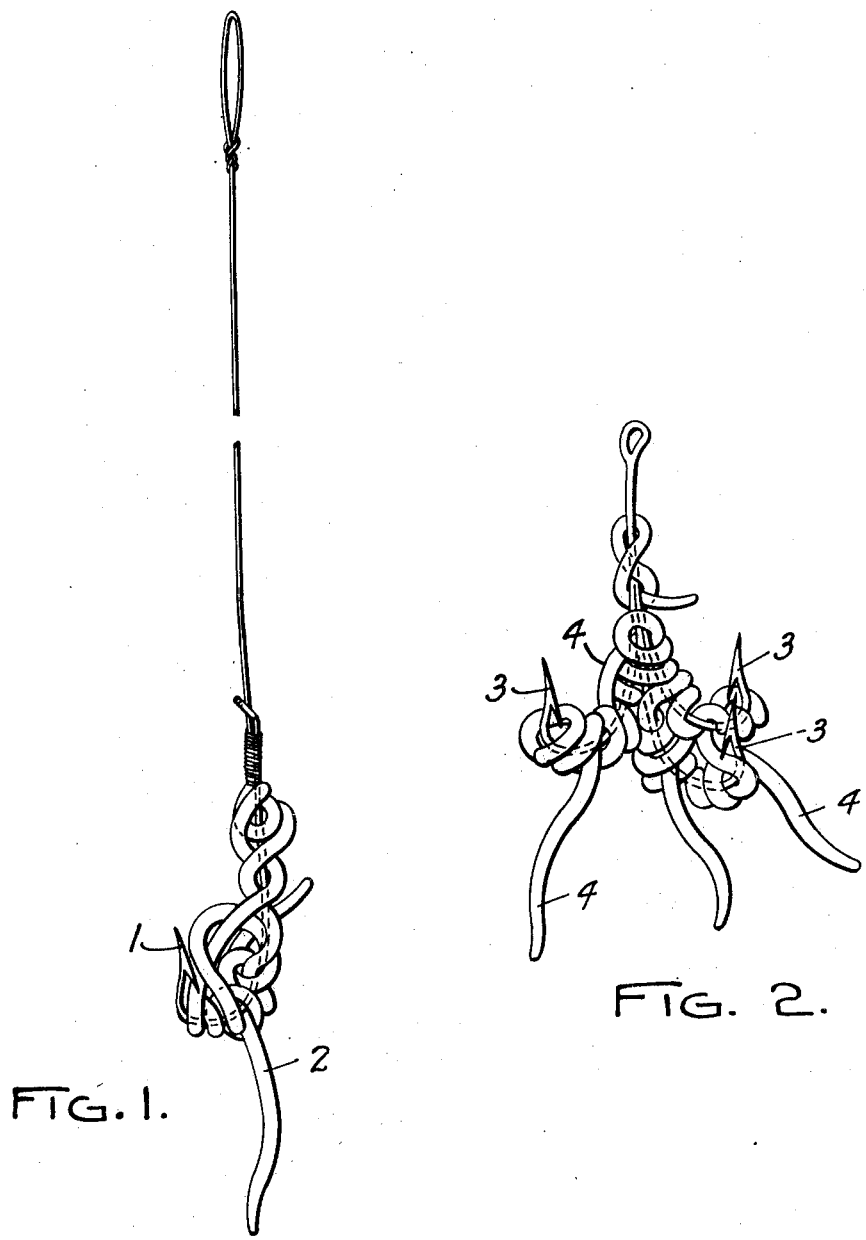

1,922,841

UNITED STATES PATENT OFFICE 1,922,841

PROCESS OF MANUFACTURING FISH LURE AND FISH LURE MADE THEREBY

Earl Cooley, Trinidad, Colo.

Application June 13, 1931. Serial No. 544,132

13 Claims. (Cl. 43—42)

My invention relates to fishing lures or baits and more especially to a process for manufacturing the same and to the lure or bait as thereby manufactured.

In bait fishing, especially in bait fishing with worms, the fisherman must first dig or buy the worms, and since they will not stay tied upon the hook they are pierced by the hook, which soon kills them or tears them in two, and the fisherman must continually be putting new worms on the hook.

It is therefore the object of this invention to provide a process by which a natural appearing and natural artificial worm may be made and mounted upon a hook.

A further object is to provide a process for manufacturing such an artificial worm and to provide the worm with an aroma which will tend to make the fish bite the bait.

A further object is to provide a worm made by my process which will stay on the hook, entice the fish to bite, and which because of its composition will not only wiggle in the water as a result of the action of the current, but which will also be durable and which will last a long time in actual fishing.

My process consists of warming pure gum rubber and rolling it into imitation worms of the desired size and length. I have discovered that warming up or heating the pure gum rubber permits this operation to be easily done. The artificial worm is next wrapped, looped and tied upon a fish hook to resemble the clustered effect or any other effect such as may be produced by fishermen by means of a natural angle worm.

With my artificial lure, however, it is not necessary to pierce the worm by the hook and thereby tear it and shorten its term of usefulness, as it can be wrapped, tied and looped so as to stay securely upon the hook, and the material is so soft and flexible that the free ends if left a bit long will weave and wiggle about in the water and produce results similar to those produced by a natural worm.

The worm on the hook is next treated as follows:—A small amount of pure gum rubber is placed in a vessel containing oil of anise, and the rubber completely dissolved to form a solution of rubber in oil of anise. The worm mounted on the hook is then immersed in this rubber anise oil solution for a very short time.

The worm may be treated with the anise oil solution before being mounted on the hook if desired, though I prefer treating the mounted worm as described.

In any case the result is that the worm is covered by a thin film of anise rubber solution which cements to the worm, and the odor of which therefore persists for a long time.

If no gum rubber is dissolved in the anise oil to start with, it will nevertheless soon become a solution of rubber in anise oil from the rubber of the worms immersed in the oil, a small portion of each of which will be dissolved.

The above is my process; the lure made by my process comprises a fish hook, and an anise oil treated worm of gum rubber mounted upon the hook.

In the drawing:—

Figure 1 shows one of my imitation angle worms on a single fish hook provided with a gut snell, by which it may be attached to a leader or line.

Figure 2 shows one or more of my imitation worms on a triple hook which may be attached to a spinner, leader, or line as the fisherman desires.

In Figure 1 the hook 1, has the worm 2 wrapped, looped and tied upon it. Several of my worms may be tied upon a single hook if the fisherman believes such a lure would be better.

In Figure 2 the hook 3 has the worm or worms 4, wrapped, looped and tied upon it.

The number of wrappings and loops and knots as well as the loose ends may be left to the taste or judgment of the fisherman.

For, though my lure may be marketed in the form of a worm ready mounted upon the hook, it is possible for the fisherman to dismount the worm and tie it upon the hook in any manner best suited to his idea of the needs of the occasion.

Though only one size of worm is shown in the drawing, they may be made in different sizes if desired. For instance, they may be made of a larger size to imitate what fishermen call "night crawlers".

In my experiments I discovered that natural gum rubber is easily soluble in oil of anise; I also discovered that natural gum rubber when heated will work easily into a worm shape by rolling and will retain substantially the same shape when the gum cools off.

I next found by experiments that the rubber worm would, when properly mounted upon the hook, wiggle and weave about in substantially the same manner as a natural worm when properly mounted upon the hook.

I next discovered that though the untreated rubber worm would attract the fish, it required the anise treated rubber worm to hasten their actual taking of the worm.

Having now described my process and my device, what I claim as new and desire to protect by Letters Patent, is as follows:—

1. The process of manufacturing a fish lure comprising rolling heated gum rubber into the form and shape of an angle worm, wrapping, looping and tying the worm upon a fish hook, and treating the assembled worm and hook with anise oil.

2. The process of manufacturing a fish lure comprising rolling heated rubber gum into the form and shape of an angle worm, covering the worm thus formed with a solution of anise oil and natural gum rubber and mounting the anise oil treated worm upon a fish hook.

3. The process of manufacturing a fish lure comprising rolling heated rubber gum into the form and shape of an angle worm, mounting the worm on a fish hook and covering the worm and hook with a solution of anise oil and natural gum rubber.

4. The process of manufacturing a fish lure comprising rolling heated rubber gum into the form and shape of an angle worm, covering the worm with a solution of anise oil and natural gum rubber and mounting the treated worm on a fish hook.

5. The process of manufacturing a fish lure comprising mounting on a fish hook an imitation angle worm of rubber gum and covering the mounted worm and the hook with a solution of anise oil and natural gum rubber.

6. The process of manufacturing a fish lure comprising treating an imitation angle worm of natural gum rubber with a solution of rubber and anise oil.

7. The process of manufacturing a fish lure comprising treating an imitation angle worm of natural gum rubber with a solution of rubber and anise oil and mounting and securing the treated worm upon a fish hook.

8. The process of manufacturing a fish lure comprising treating a natural rubber gum imitation angle worm with a solution of natural rubber and anise oil, and mounting the worm so treated upon a fish hook to imitate a natural worm so mounted.

9. As an article of manufacture, a fish lure composed of a fish hook, and an imitation angle worm composed of pure rubber gum and covered by a film of rubber dissolved in anise oil.

10. As an article of manufacture, an imitation angle worm composed of natural rubber gum covered with a solution of anise oil combined with rubber to form a film of anise scented rubber covering and imitation worm.

11. As an article of manufacture, a fish hook and an imitation angle worm formed to the shape and size and appearance of a natural angle worm and covered with a solution of anise oil and natural rubber gum to form a film of anise scented rubber covering said imitation worm, mounted upon and secured to said fish hook.

12. The process of manufacturing a fish lure comprising treating an imitation bait of natural gum rubber with a solution of rubber and anise oil.

13. As an article of manufacture, a fish lure composed of an imitation bait of natural rubber gum covered with a solution of gum rubber and anise oil.

EARL COOLEY.